(12) United States Patent
Huang et al.

(10) Patent No.: US 10,749,177 B2
(45) Date of Patent: Aug. 18, 2020

(54) METHOD OF SYNTHESIZING PHOSPHATE SALT OF HIGH PURITY FOR PREPARATION OF ELECTRODE MATERIAL

(71) Applicants: Guiqing Huang, Newton, MA (US); Boshan Mo, Newton, MA (US); Youde Mo, Newton, MA (US)

(72) Inventors: Guiqing Huang, Newton, MA (US); Boshan Mo, Newton, MA (US); Youde Mo, Newton, MA (US)

(73) Assignees: Guangxi Nowphene Energy Storage Technologies Co., Ltd, Nanning (CN); Boston Global Technologies, LLC, Newton, MA (US)

( * ) Notice: Subject to any disclaimer, the term of this patent is extended or adjusted under 35 U.S.C. 154(b) by 128 days.

(21) Appl. No.: 16/038,155

(22) Filed: Jul. 17, 2018

(65) Prior Publication Data

US 2020/0028171 A1   Jan. 23, 2020

(51) Int. Cl.
| | | |
|---|---|---|
| *H01M 4/58* | (2010.01) |
| *H01M 4/525* | (2010.01) |
| *H01M 4/505* | (2010.01) |
| *H01M 4/04* | (2006.01) |
| *H01M 10/36* | (2010.01) |
| *H01M 4/02* | (2006.01) |

(52) U.S. Cl.
CPC ....... *H01M 4/5825* (2013.01); *H01M 4/0442* (2013.01); *H01M 4/0464* (2013.01); *H01M 4/0497* (2013.01); *H01M 4/505* (2013.01); *H01M 4/525* (2013.01); *H01M 10/36* (2013.01); *H01M 2004/028* (2013.01); *H01M 2300/0008* (2013.01)

(58) Field of Classification Search
CPC ............ H01M 4/0442; H01M 4/0464; H01M 4/0497; H01M 4/5825
USPC ...................................... 429/218.1
See application file for complete search history.

(56) References Cited

U.S. PATENT DOCUMENTS

| | | | | |
|---|---|---|---|---|
| 2002/0114754 A1* | 8/2002 | Hosoya | ................ | H01M 4/366 423/306 |
| 2010/0193924 A1* | 8/2010 | Goto | .................. | H01L 23/4951 257/676 |
| 2010/0261063 A1* | 10/2010 | Kitagawa | ............... | C01B 25/37 429/232 |

* cited by examiner

*Primary Examiner* — James M Erwin
(74) *Attorney, Agent, or Firm* — Guosheng Wang; United States Research and Patent Firm (57) ABSTRACT

The present invention provides a cost-effective method of synthesizing phosphate salt of a metal M such as Fe and Mn that can be used for electrode active material of a lithium secondary battery. An oxidization-precipitation reaction is carried out on metal such as Fe(II) and Mn(II) to produce phosphate salt and hydroxide of the metal oxidized e.g. Fe(III) and Mn(III). With overdosed phosphoric acid, hydroxide of the oxidized metal is then converted to a phosphate salt. The invention also provides a method of preparing "wet" phosphate salt nanoparticles and their application in the synthesis of a cathode material. The present invention exhibits numerous technical merits such as lower cost, easier operation, and being environmentally friendly.

19 Claims, 7 Drawing Sheets

METHOD OF SYNTHESIZING PHOSPHATE SALT OF HIGH PURITY FOR PREPARATION OF ELECTRODE MATERIAL

CROSS-REFERENCE TO RELATED APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

FIELD OF THE INVENTION

The present invention generally relates to a method of synthesizing a high-purity phosphate salt of a metal. Although the invention will be illustrated, explained and exemplified by phosphate salts of Fe and Mn useful as an electrode active material for a lithium secondary battery, it should be appreciated that the present invention can also be applied in other fields.

BACKGROUND OF THE INVENTION

The microminiaturization of electronic components has created widespread growth in the use of portable electronic devices such as cellular phones, pagers, video cameras, facsimile machines, portable stereophonic equipment, personal organizers and personal computers. As a result, the demand of improved power sources for these devices has been increased. Moreover, telecommunication backup batteries, hybrid electric vehicles, and electric vehicles also require advanced battery materials to meet the high demand and performance. Preferably, the battery materials are environmentally benign and relatively low cost to make these expanded battery applications practical. Relevant batteries include primary batteries, i.e., batteries designed for use through a single charging cycle, and secondary batteries, i.e., batteries designed to be rechargeable. Some batteries designed essentially as primary batteries may be rechargeable to some extent.

Batteries based on lithium have been the subject of considerable development effort and are being sold commercially Lithium-based batteries have become commercially successful due to their relatively high energy density. Lithium-based batteries generally use electrolytes containing lithium ions. The negative electrodes for these batteries can include lithium metal or alloy (lithium batteries), or compositions that intercalate lithium (lithium ion batteries). Preferred electroactive materials for incorporation into the positive electrodes are compositions that intercalate lithium. For example, metal phosphates are candidates for the production of cathode materials that intercalate lithium.

An example of lithium-ion battery is the lithium ferrophosphate ($LiFePO_4$, or LFP) battery, in which $LiFePO_4$ is used as the cathode material LFP exhibits some advantages such as low cost, non-toxicity, natural abundance, excellent thermal stability, safely characteristics, electrochemical performance, and specific capacity (170 mA·h/g, or 610 C/g). As such, LFP battery is even finding a number of roles in vehicle use and backup power, among others. However, LFP batteries are still expensive to produce. For instance, in order to manufacture LFP active material and its dopant, one major production method is using iron oxalate as Fe source precursor and $NH_4H_2PO_4$ as $PO_4$ source or P source precursor. The drawback is that the manufacturing process for iron oxalate and $NH_4H_2PO_4$ generates hazardous gas, and the processing cost is very high. Another method is the use of fine quality iron phosphate as precursor for both Fe and $PO_4$ source. However, the manufacturing cost for iron phosphate is also very high.

Another concern associated with traditional methods is the disposing of phosphorous material, which is strictly regulated by the environmental protection agency in all countries.

Factors under consideration for $LiFePO_4$ synthesis include carbon coating, particle size minimization and/or metal tons doping for the purpose of improving the performances of cathode materials in terms of energy density, power density (rate capability), cycle life (stability). Regarding particle size minimization, nanosize carbon coated $LiFePO_4$ cathode materials display very excellent electrochemistry properties. Nanosize $LiFePO_4$ particles with micron/nanostructures are highly desired for designing high-performance lithium-ion batteries with high volumetric energy density and good rate capability. These structured $LiFePO_4$/C particles create 3D electronic and ionic pathways, which facilitate electron migration in the solid phase and lithium ion diffusion in the liquid phase and provide the material excellent cyclability and superior rate capability. These micron/submicron-sized $LiFePO_4$ well-structured particles have a high tap density and, as electrodes, show excellent rate capability and cycle stability.

Thus, there exists not only a need of new method or process that can produce LFP and $FePO_4$ at a lower cost and in a more environmentally friendly way, but also a need of simpler and more cost-effective method for preparing nanosize LiFePO4 particles. Advantageously, the present invention provides a novel method of synthesizing a phosphate salt that can meet these needs.

SUMMARY OF THE INVENTION

One aspect of the present invention provides a method of synthesizing a high-purity phosphate salt of a metal M. The method includes the following steps:

(i) providing an aqueous solution of metal M(Va) having a first valence value Va;

(ii) adding a precipitating-oxidizing composition to the aqueous solution to produce a liquid phase and a precipitate of metal M(Vb) having a second valence value Vb, wherein the second valence value Vb is greater than the first valence value Va, and wherein the precipitate of metal M(Vb) comprises phosphate salt of metal M(Vb) hydroxide of metal M(Vb), or any mixture thereof;

(iii) isolating said precipitate of metal M(Vb) from the liquid phase, and (iv) adding phosphoric acid and water to the isolated precipitate of metal M(Vb), and heating the reaction mixture to an elevated temperature (e.g. 80-100° C.) to convert hydroxide of metal M(Vb) in the isolated precipitate to phosphate salt of metal M(Vb).

The above features and advantages and other features and advantages of the present invention are readily apparent from the following detailed description of the best modes for carrying out the invention when taken in connection with the accompanying drawings.

BRIEF DESCRIPTION OF THE SEVERAL VIEWS OF THE DRAWINGS

The present invention is illustrated by way of example, and not by way of limitation, in the figures of the accompanying drawings and m which like reference numerals refer to similar elements.

DETAILED DESCRIPTION OF THE PREFERRED EMBODIMENT

The following description, for the purposes of explanation, numerous specific details are set forth in order to provide a thorough understanding of the present invention. In is apparent, however, to one skilled in the art that the present invention may be practiced without these specific details or with an equivalent arrangement.

Where a numerical range is disclosed herein, unless otherwise specified, such range is continuous, inclusive of both the minimum and maximum values of the range as well as every value between such minimum and maximum values. Still further, where a range refers to integers, only the integers from the minimum value to and including the maximum value of such range are included. In addition, where multiple ranges are provided to describe a feature or characteristic, such ranges can be combined. As used in the description herein and throughout the claims that follow, the meaning of "a", "an", and "the" includes plural reference unless the context clearly dictates otherwise. In a reaction equation, "aq" stands for "aqueous", and "s" stands for solid.

In various embodiments, the present invention provides a method of synthesizing a phosphate salt of a metal M. Examples of the metal M includes, but is not limited to, any suitable metal that has multiple (e.g. two) valence values such as Fe, Co, Ni, Mn, Ti, V, or any combination thereof. In specific embodiments, metal M includes, but is not limited to, a transitional metal with multiple valence values such as Fe, Mn, Co, Ni, or any combination thereof. The term "multiple valence values" is intended to mean that metal M has at least two valence value, defined as a first valence value Va and a second valence value Vb. The second valence value Vb is greater than the first one Va. Vb is an integer greater than 1, Va may be 1, 2, 3, 4, and 5 etc., while Vb may be 2, 3,4, 5 and 6 etc. For example, Va of Fe, Co, Ni and Mn may be II or +2, and Vb of Fe, Co, Ni and Mn may be III or +3. The present invention provides a method of synthesizing a phosphate salt of a metal M that has the second valence value Vb, represented as M(Vb), M(+Vb), $M^{Vb}$ or $M^{+Vb}$. The salt can therefore be represented as $M_3(PO_4)_{Vb}$, such as $FePO_4$ and $MnPO_4$.

As described above, examples of the metal M includes, but is not limited to, any suitable metal that has multiple (e.g. two) valence values such as Fe, Co, Ni, Mn, Ti, V, or any combination thereof. The term "any combination thereof" is intended to mean that two metals M1 and M2 or more are present in the phosphate salt (a "co-salt") product of M1(Vb1) and M2(Vb2), for example, $Fe(III)_xIn(III)_{(1-x)}PO_4$, wherein 0<x<1.

Figure 1:
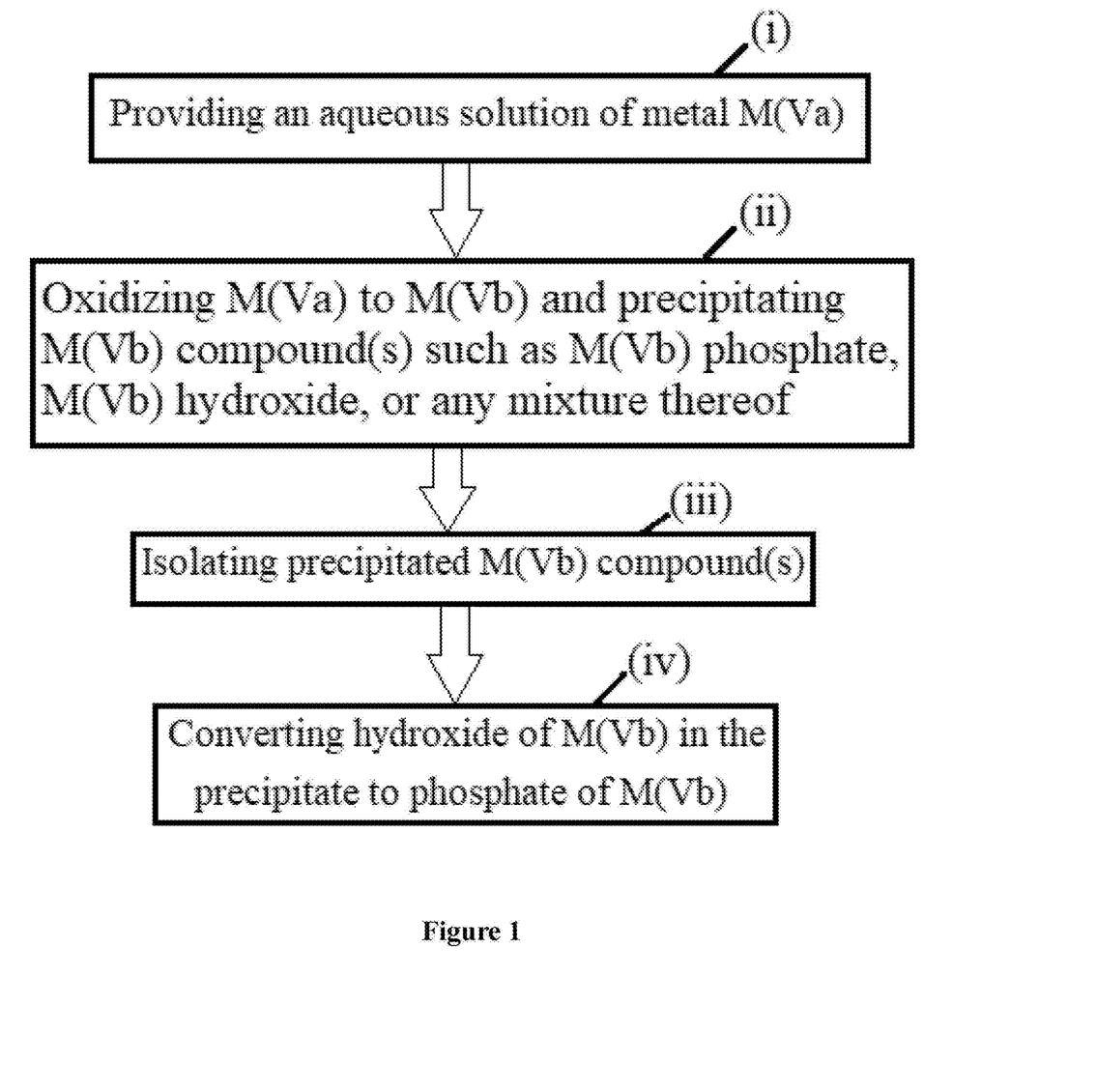
FIG. 1 schematically illustrates a method of synthesizing a high-purity phosphate salt of a metal M in accordance with an exemplary embodiment of the present invention.

As shown in FIG. 1, the general method of the present invention comprises at least four steps. Step (i) is providing an aqueous solution of the metal M having a first valence value Va, for short, M(Va). Such an aqueous solution can be provided by any suitable method front any suitable resources, for example, dissolving $FeSO_4$ and/or $FeCl_2$ of industrial grade in water. The aqueous solution may contain possible impurities such as $SO_4^{2-}$, $Cl^-$, $Li^+$, $Na^+$, $K^+$, $Rb^+$, $Cs^+$ or any mixture thereof. In some embodiments, the aqueous solution of metal M(Va) in this step consists essentially of, or consists of, M(Va) sulfate and/or chloride, water, and impurities; and excludes other major metal ions and other anions.

Step (ii) in FIG. 1 may be an oxidization-precipitation reaction. Specifically, a precipitating-oxidizing composition is added to the aqueous solution to produce a liquid phase, and a precipitate of metal M(Vb), wherein Vb≤Va. The precipitate of M(Vb) comprises water-insoluble compounds of M(Vb), such as phosphate salt of metal M(Vb), hydroxide of metal M(Vb), or any mixture thereof. Typically, the precipitate of metal M(Vb) includes hydroxide of metal M(Vb), or a mixture of hydroxide of metal M(Vb) and phosphate salt of metal M(Vb). Now, the liquid phase may contain possible impurities such as $SO_4^{2-}$, $Cl^-$, $Li^+$, $Na^+$, $K^+$, $Rb^+$, $Cs^+$ or $NH_4^+$ or any mixture thereof. In some embodiments, the precipitate of M(Vb) consists essentially of, or consists of, phosphate salt of metal M(Vb) and or hydroxide of metal M(Vb), and impurities; and excludes other major components.

Step (iii) in FIG. 1 is isolating the precipitate of metal M(Vb) from the liquid phase (or water phase). The majority of the aforementioned possible impurities are contained in the liquid phase. The impurities will remain in the liquid phase after the isolation or separation, and will be removed away from the precipitate of metal M(Vb) The term "majority" can mean at least 50%, at least 60%, at least 70%, at least 80%, at least 90%, or at least 95% by weight of the impurities. However, a residual amount of the impurities (such as less than 50%, less than 40%, less than 30%, less than 20%, less than 10%, less than 5% by weight of the impurities) may remain in the precipitate of metal M(Vb) (commonly the "solid phase"). If desired, the residual amount of the impurities in the precipitate of metal M(Vb) may be further removed by e.g. washing the precipitate with DI water for one or more times.

Step (iv) in FIG. 1 is adding extra or more phosphoric acid and water to the isolated precipitate of metal M(Vb), and heating the reaction mixture to an elevated temperature (e.g. 80-100° C.) to convert hydroxide of metal M(Vb) (if any) in the isolated precipitate into phosphate salt of metal M(Vb) such as $Fe_xMn_{(1-x)}PO_4$, wherein $0 \le x \le 1$. In some embodiments, the reaction mixture in step (iv) consists essentially of, or consists of, phosphoric acid, water and the precipitate of M(Vb) from step (iii) washed or unwashed, and impurities; and excludes other major components.

In a variety of exemplary embodiments, the method as shown in FIG. 1 may further include one or more optional steps, as will be described in details.

Embodiments of Step (i): Aqueous Solution of M(Va)

The aqueous solution can be provided by any suitable method from any suitable resources, for example, dissolving $FeSO_4$ and/or $FeCl_2$ of industrial grade in water so that the Fe(II) concentration in the solution is 0.5M~2.5M such as 1.5M. In a preferred embodiment, M(Va) is Fe(II) and or Mn(ii). In some embodiments, the aqueous solution of Fe(II) in step (i) may be obtained by processing or recycling an industrial waste containing Fe(II) compound such as $FeSO_4 \cdot 7H_2O$ and/or $FeCl_2$. For example, the industrial waste may be discharged from a plant of titanium dioxide ($TiO_2$), and may therefore contain $FeSO_4 \cdot 7H_2O$ and/or $FeCl_2$, and Ti impurity compounds such as $TiO_2$.

Figure 2:
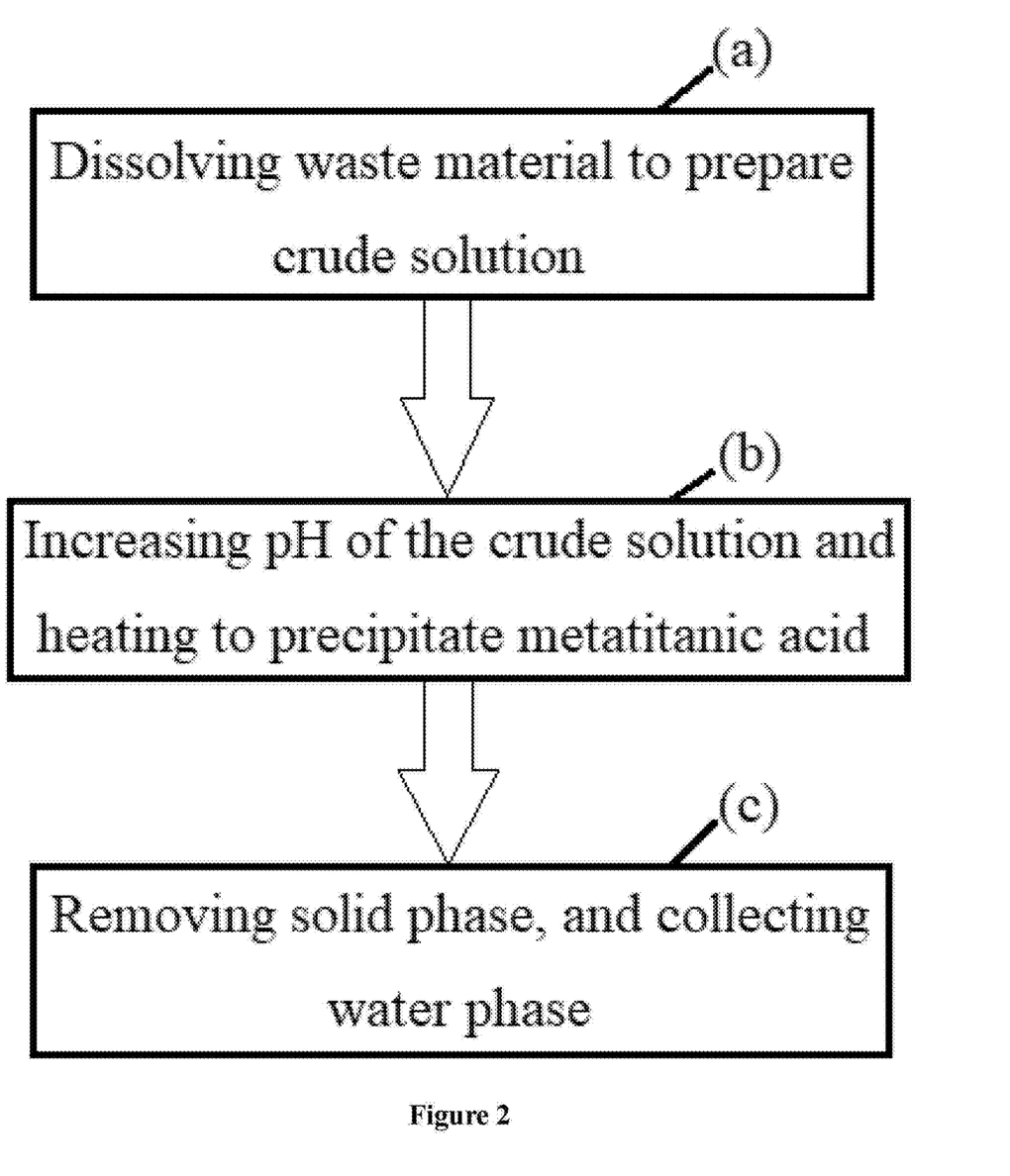
FIG. 2 schematically illustrates a method of processing an industrial waste containing $FeSO_4 \cdot 7H_2O$ and/or $FeCl_2$ and Ti impurity compounds in accordance with an exemplary embodiment of the present invention.

In some embodiments as shown in FIG. 2, the processing of the industrial waste containing $FeSO_4 \cdot 7H_2O$ and/or $FeCl_2$, and Ti impurity compounds may include:

Step (a): dissolving the waste material in water to prepare a crude solution:

Step (b): increasing pH of the crude solution from about 2.5 to 3.5~5.5 with a basic agent such as NaOH, $Na_2CO_3$, $NH_4OH$ or mixture thereof, and heating the crude solution at an elevated temperature such as 50-70° C. to precipitate a solid phase comprising metatitanic acid; and Step (c): removing the solid phase, and collecting the water phase of the crude solution, thereby providing an aqueous solution of $FeSO_4$ and/or $FeCl_2$, which is an example of the aqueous solution of metal M(Va) in above step (i).

Embodiments of Step (ii): Oxidization and Precipitation

In various embodiment of the invention, the precipitating-oxidizing composition used in step (ii) may include:

(1) an oxidizing agent such as hydrogen peroxide, sodium persulfate, sodium perchlorate, or any combination thereof, for oxidizing metal M(Va) to metal M(Vb), (2) a basic agent (e.g. NaOH, $Na_2CO_3$, $NH_4OH$ or mixture thereof) for adjusting pH into a general range of about 1.5~7.5 to enable the precipitation reaction of M(Vb) in step (ii), and (3) an optional agent (or a phosphate source) selected from phosphoric acid, hydrogen phosphate, dihydrogen phosphate, or any mixture thereof.

In step (ii), the amount of phosphate source (if any) is no more than the stoichiometric amount as required for a complete precipitation reaction between the phosphate and the metal M(Vb) to produce M(Vb) phosphate solid/precipitate. In other words, the amount of M(Vb) is no less than (preferably higher than) the stoichiometric amount as required for the complete precipitation reaction between the phosphate source and the metal M(Vb) to produce M(Vb) phosphate solid/precipitate. Excess or extra M(Vb) (if any) that has not been precipitated as M(Vb) phosphate will be precipitated by $OH^-$ as M(Vb) hydroxide. As a result, the liquid phase in step (ii) may contain less than 0.5 ppm of P, which complies with the environmental regulation regarding P content in waste liquid. This is an advantage of the embodiment over known methods. As another result, hydroxide of metal M(Vb) and phosphate salt of metal M(Vb) in the precipitate of step (ii) will have a molar ratio from 0:100 to 100:0, preferably from 1:99 to 99:1, more preferably from 15:85 to 60:40, and most preferably from 25:75 to 50:50.

Depends on the types of reactants, the pH in step (ii) may be tailored to any suitable value for the M(Vb) precipitation. Generally, the pH is in the range of 1.5~7.5. For example, when the pH is 1.5~2.0, $FePO_4$ is completely precipitated. When the amount of $PO_4$ source is controlled to be insufficient or no more than enough, $PO_4$ is completely precipitated, but Fe(III) is not necessarily completely precipitated. When pH is increased to 2.5-4.0 such as 3.5-4.0, Fe(III) will be precipitated as $Fe(OH)_3$. Therefore, all Fe(III) can be precipitated at pH 2.5-4.0 such as 3.5-4.0.

In contrast, all Mn(III) can be precipitated at pH 4.0~7.5. When pH is about 5.5, $MnPO_4$ is completely precipitated. When the amount of $PO_4$ source is controlled to be insufficient or no more than enough, $PO_4$ is completely precipitated, but Mn(III) is not necessarily completely precipitated. When pH is slightly increased to about 6.5, Mn(III) will be precipitated as $Mn(OH)_3$. Therefore, all Mn(III) can be precipitated at pH 6.0-7.5.

In typical embodiments, the phosphate salt of M(Vb) as the product of this step is in amorphous form.

Embodiments of Step (iii): Isolation and Purification

In various embodiment of the invention, isolating the precipitate of metal M(Vb) from the liquid phase in step (ii) is carried out with a filter press such as a plate and frame filter press, a centrifuge, or any combination thereof.

Because hydroxide of metal M(Vb) aid phosphate salt of metal M(Vb) have been selectively precipitated out in step (ii), the liquid phase may contain 80-90% by weight of total impurities in the reaction system, selected from $SO_4^{2-}$, $Cl^-$, $Li^+$, $Na^+$, $K^+$, $Rb^+$, $Cs^+$, $NH_4^+$, or any mixture thereof.

In preferred embodiments, the isolated precipitate of metal M(Vb) may be washed or purified with DI water for one or more times after step (iii) but before step (iv), to further decrease the amount of those impurities, down to a desired level.

Embodiments of Step (iv): Conversion of M(Vb) Hydroxide to M(Vb) Phosphate

Contrary to step (ii), the amount of phosphoric acid used in step (iv) is typically higher than the stoichiometric amount as required for the complete conversion of M(Vb) hydroxide in the isolated precipitate of metal M(Vb), to M(Vb) phosphate. Consequently, the process of the invention may include an additional step of recycling/reusing the phosphoric acid that has not been used or reacted with hydroxide of metal M(Vb) in step (iv) to produce phosphate salt of metal M(Vb), an "extra phosphoric acid". The recycled phosphoric acid from step (iv) may be reutilized back in step (ii) as a component in the precipitating-oxidizing composition, if needed.

In various embodiment of the invention, M(Vb) is Fe(III), Mn(III) or any combination thereof. The amount of phosphoric acid added to the isolated precipitate of metal M(Vb) in step (iv) is controlled to satisfy a ratio of P:M The symbol "M" stands for the moles of M(Vb) atoms/ions of the isolated M(Vb) precipitate in step (iii). The symbol "P" stands for a sum of (A) the moles of P atoms in the phosphoric acid added to the isolated precipitate metal M(Vb) in step (iv) and (B) the moles of P atoms (if any) present in the isolated precipitate of metal M(Vb) from step (iii). The ratio range of P:M is generally from 1:1 to 1.15:1, preferably from 1.01:1 to 1.15:1, more preferably from 1.05:1 to 1.15:1, and most preferably from 1.05:1 to 1.10:1.

In some embodiments, step (iv) may be modified as adding phosphoric acid, water, and M(Vb) phosphate synthesized using a method different from the method as described in the SUMMARY OF THE INVENTION, to the isolated precipitate of metal M(Vb), and healing the reaction mixture to an elevated temperature to convert hydroxide of metal M(Vb) in the isolated precipitate to phosphate salt of metal M(Vb). In some embodiments, the reaction mixture in this modified step (iv) consists essentially of, or consists of, phosphoric acid, water, the precipitate of M(Vb) from step (iii) washed or unwashed, M(Vb) phosphate synthesized using the different method, and impurities, and excludes other major components.

In other embodiments, step (iv) may be modified as adding phosphoric acid, water and reactants for a reaction that yields M(Vb) phosphate, to the isolated precipitate of metal M(Vb), and healing the reaction mixture to an elevated temperature to convert M(Vb) hydroxide in the isolated precipitate to M(Vb) phosphate, and to oxidize said M(Va) compounds with said oxidizing agent to yield M(Vb) phosphate. In some embodiments, the reaction mixture in this modified step (iv) consists essentially of, or consists of, phosphoric acid, water, the precipitate of M(Vb) from step (iii) washed or unwashed, the reactants for a reaction that yields M(Vb) phosphate, and impurities, and excludes other major components.

The reactants for a reaction that yields M(Vb) phosphate may comprise (i) M(Va) compounds such as M(Va) phosphate, M(Va) phosphate, M(Va) hydrogen phosphate, M(Va) hydroxide, M(Va) carbonate, M(Va) oxalate, or any mixture thereof, and (ii) an oxidizing agent such as $H_2O_2$, $H_2O_2$ can oxidize M(Va) into M(Vb), and the reaction will produce M(Vb) phosphate and/or M(Vb) hydroxide. In preferred embodiments, M(Vb) is Fe(III), Mn(III) or any combination thereof. The amount of phosphoric acid added to the isolated precipitate of metal M(Vb)in step (iv) satisfies a defined ratio of P:M. The ratio of P:M is from 1:1 to 1.15:1, preferably from 1.01:1 to 1.15:1, more preferably from 1.05:1 to 1.15:1, and most preferably from 1.05:1 to 1.10:1. The symbol "M" stands for the moles of M atoms of the isolated precipitate of metal M(Vb) in step (iii) combined with the moles of M atoms in said M(Va) compounds produced from the reaction of said reactants. The symbol "P" stands for a sum of the moles of P atoms in the phosphoric acid added to the isolated precipitate metal M(Vb) in step (iv), the moles of P atoms in the isolated precipitate of metal M(Vb) in step (iii), and the moles of P atoms (if any) in said M(Va) compounds produced from the reaction of said reactants.

Embodiments after Step (iv); Dry Sub-Process

Figure 3:
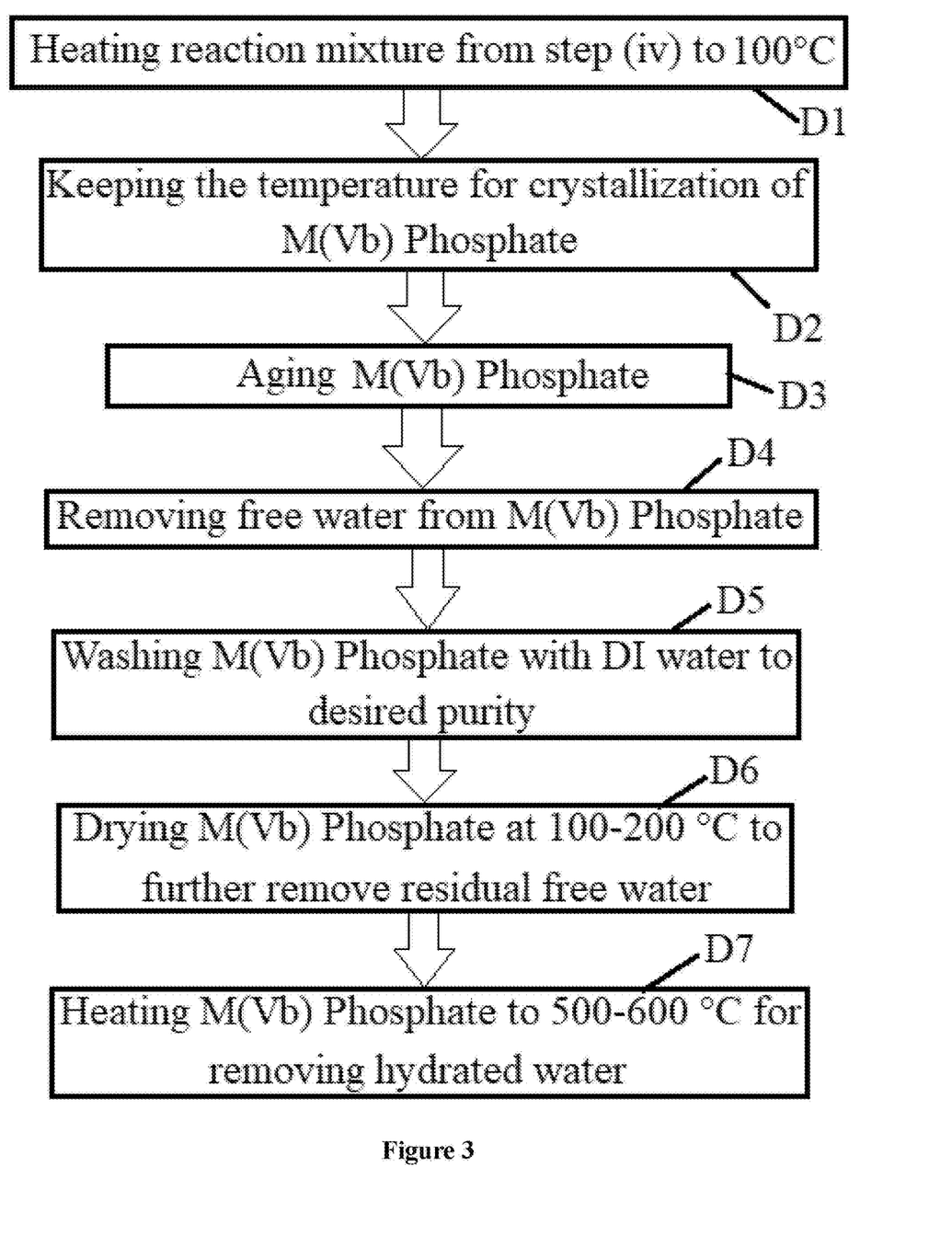
FIG. 3 schematically illustrates a dry sub-process after step (iv) to prepare anhydrous phosphate salt of metal M in accordance with an exemplary embodiment of the present invention.

The method of the present invention may further include, immediately after step (iv), the following steps, as shown in FIG. 3:

Step (D1): heating the reaction mixture of step (iv) including the phosphate salt of metal M(Vb) to a temperature of about 100° C., Step (D2): keeping the temperature for 1-5 hours for crystallization of the salt.

Step (D3): aging the salt for 2-24 hours,

Step (D4): removing free water (or extra-molecular water, or water that is not a part of the hydrated molecule) from the salt (e.g. with a filter press or a centrifuge).

Step (D5): washing the salt with D1 water aid then removing the introduced free water from the salt (e.g. with a filter press or a centrifuge), for one or more times, until the amount of total impurities selected from $SO_4^{2-}$, $Cl^-$, $Li^+$, $Na^+$, $K^+$, $Rb^+$, $Cs^+$, $NH_4^+$, or any mixture thereof is reduced to a desired level, such as less than 300 ppm, preferably less than 200 ppm, more preferably less than 100 ppm, and most preferably less than 50 ppm.

Figure 4:
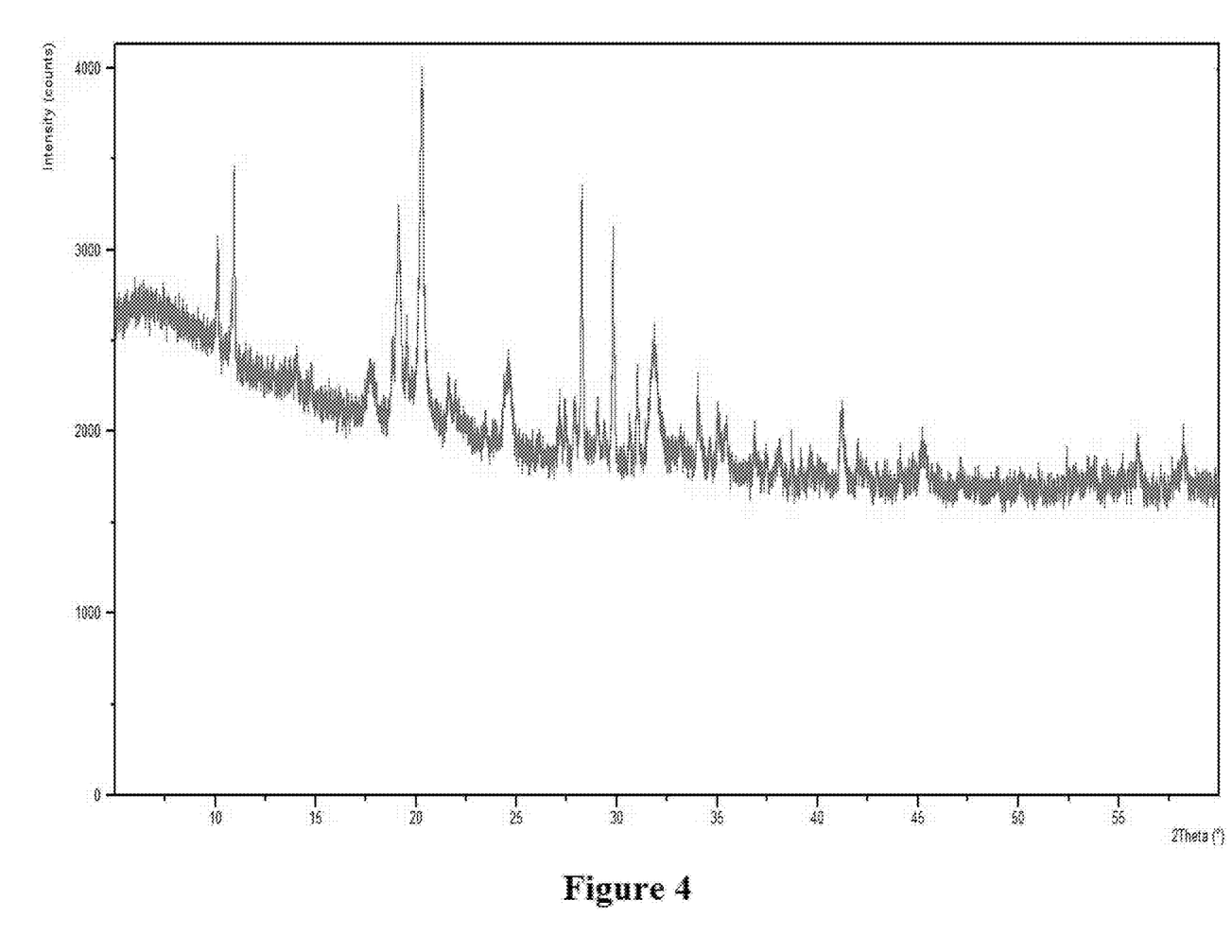
FIG. 4 shows an X-ray diffraction pattern of $Fe_xMn(1-x)PO_4 \cdot nH_2O$ (x=0-1) in accordance with an exemplary embodiment of the present invention.

Step (D6): drying the salt at a temperature of 100-200° C. to further remove residual free water from the salt. FIG. 4 shows an X-ray diffraction pattern of FexMn(1-x)PO$_4$·nH$_2$O (x=0-1) in accordance with an exemplary embodiment of the present invention.

Step (D7): heating the salt to a temperature of 500-600° C. for removing hydrated water (or intramolecular water, water that is part of the hydrated molecule) from the molecules of the salt, to obtain a fully or partially dehydrated phosphate salt crystal of metal M(Vb).

Figure 5:
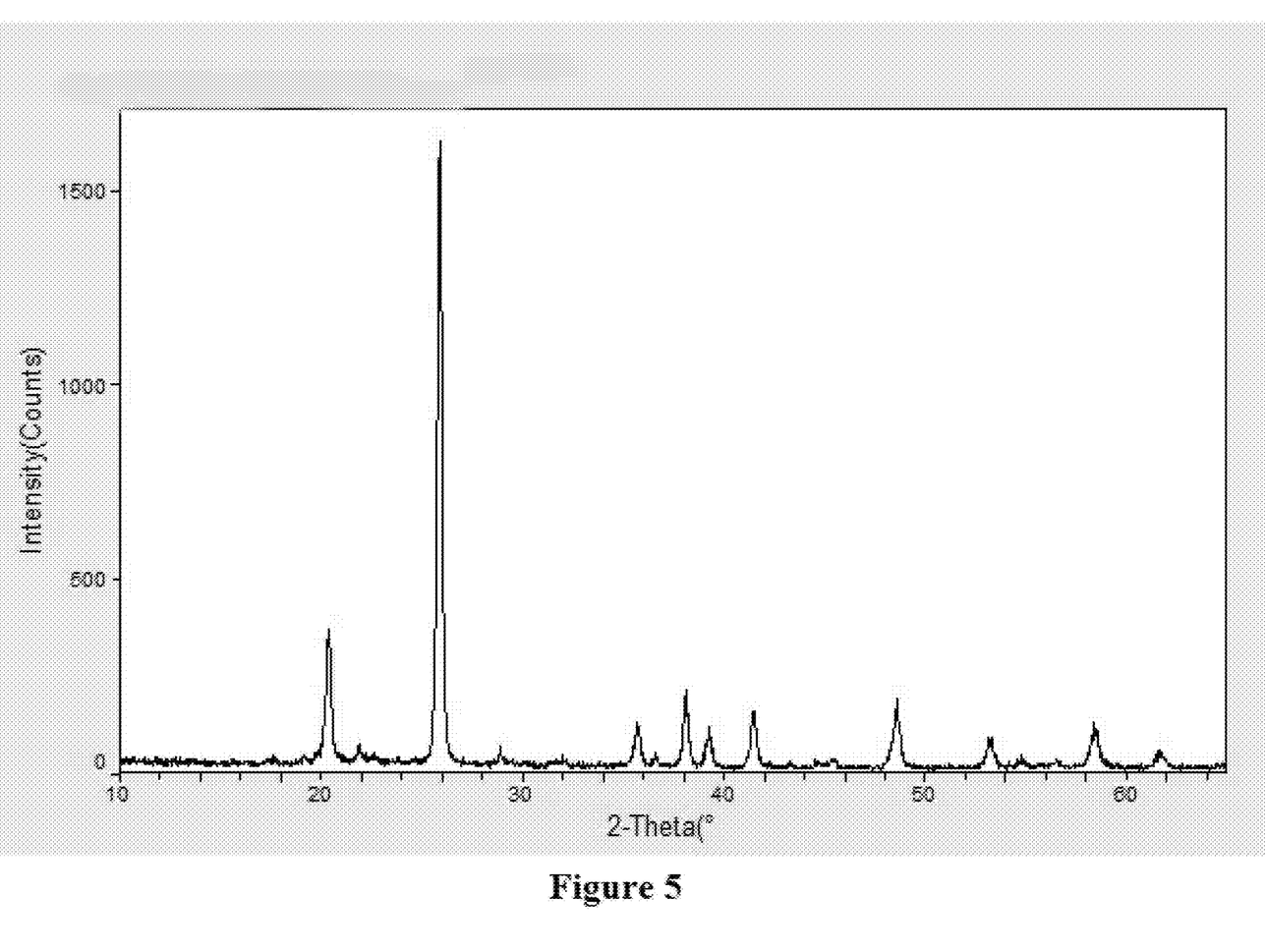
FIG. 5 shows an X-ray diffraction pattern of anhydrate $FePO_4$ in accordance with an exemplary embodiment of the present invention.

The final product of phosphate salt crystal of metal M(Vb) may be, for example, $Fe_xMn_{(1-x)}PO_4$, wherein $0 \leq x \leq 1$. FIG. 5 shows an X-ray diffraction pattern of anhydrate FePO$_4$ in accordance with an exemplary embodiment of the present invention.

Embodiments After Step (iv): Wet Sub-Process.

Figure 6:
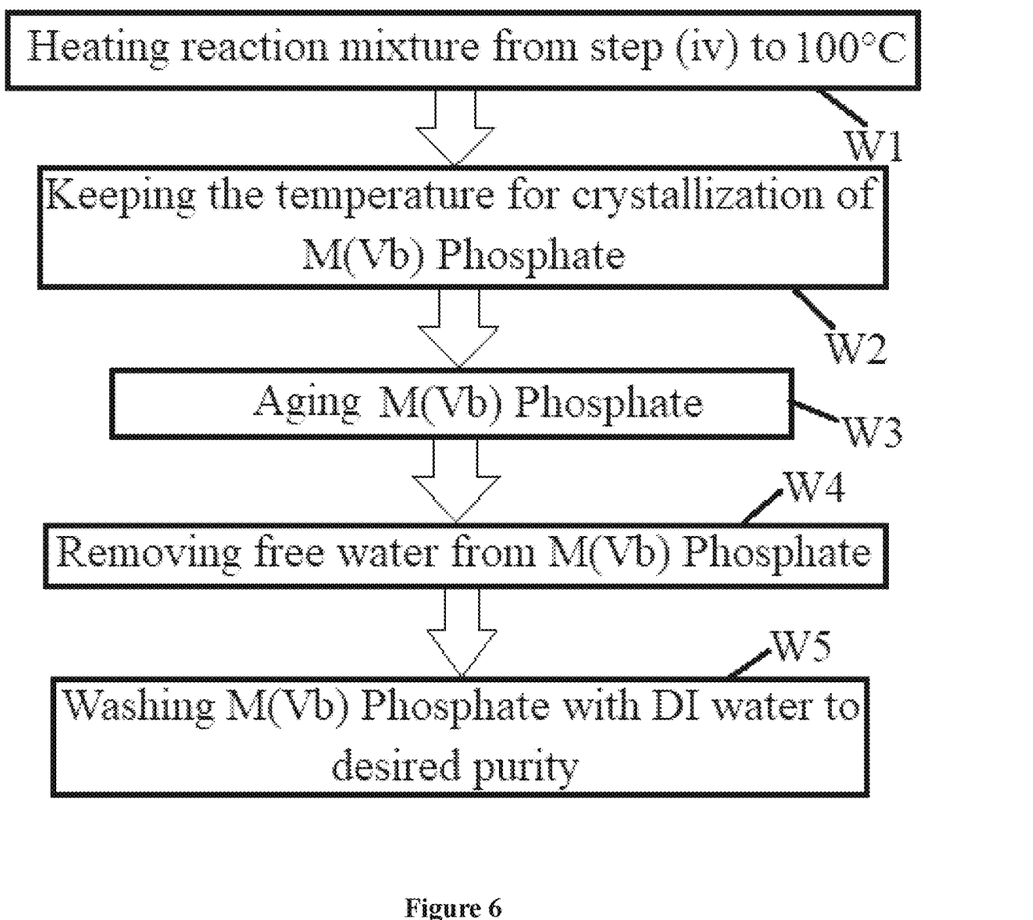
FIG. 6 schematically illustrates a wet sub-process after step (iv) to prepare "wet" M(Vb) phosphate nanoparticles in accordance with an exemplary embodiment of the present invention.

Alternatively, the method of the present invention may further include, immediately after step (iv), a wet sub-process with the following steps as shown in FIG. 6:

Step (W1): healing the reaction mixture of step (iv) containing the phosphate salt of metal M(Vb) to a temperature of about 100° C., Step (W2): keeping the temperature for 1-5 hours for crystallization of the salt, Step (W3): aging the salt for 2-24 hours.

Step (W4): removing free water (or extramolecular water) from the salt (e.g. with a filter press or a centrifuge), and Step (W5): washing the salt with DI water and then removing free water from the salt (e.g. with a filler press or a centrifuge), for one or more limes, until the amount of total impurities selected from $SO_4^{2-}$, $Cl^-$, $Li^+$, $Na^+$, $K^+$, $Rb^+$, $Cs^+$, $NH_4^+$, or any mixture thereof is reduced to a desired level, such as less than 300 ppm, preferably less than 200 ppm, more preferably less than 100 ppm, and most preferably less than 50 ppm. What obtained in step (W5) or (D5) is a "wet" phosphate salt of metal M(Vb) nanoparticles without aggregation.

However, the wet sub-process does not further include (or excludes) Step (W6), i.e. drying the "wet" phosphate salt of metal M(Vb) nanoparticles at a temperature of 100-200° C. to further remove residual free water from the salt. The wet sub-process docs not include (or excludes) Step (W7), i.e. heating the salt to a temperature of 500-600° C. for removing hydrated water (or intramolecular water) in the molecules of the salt, either.

Figure 7:
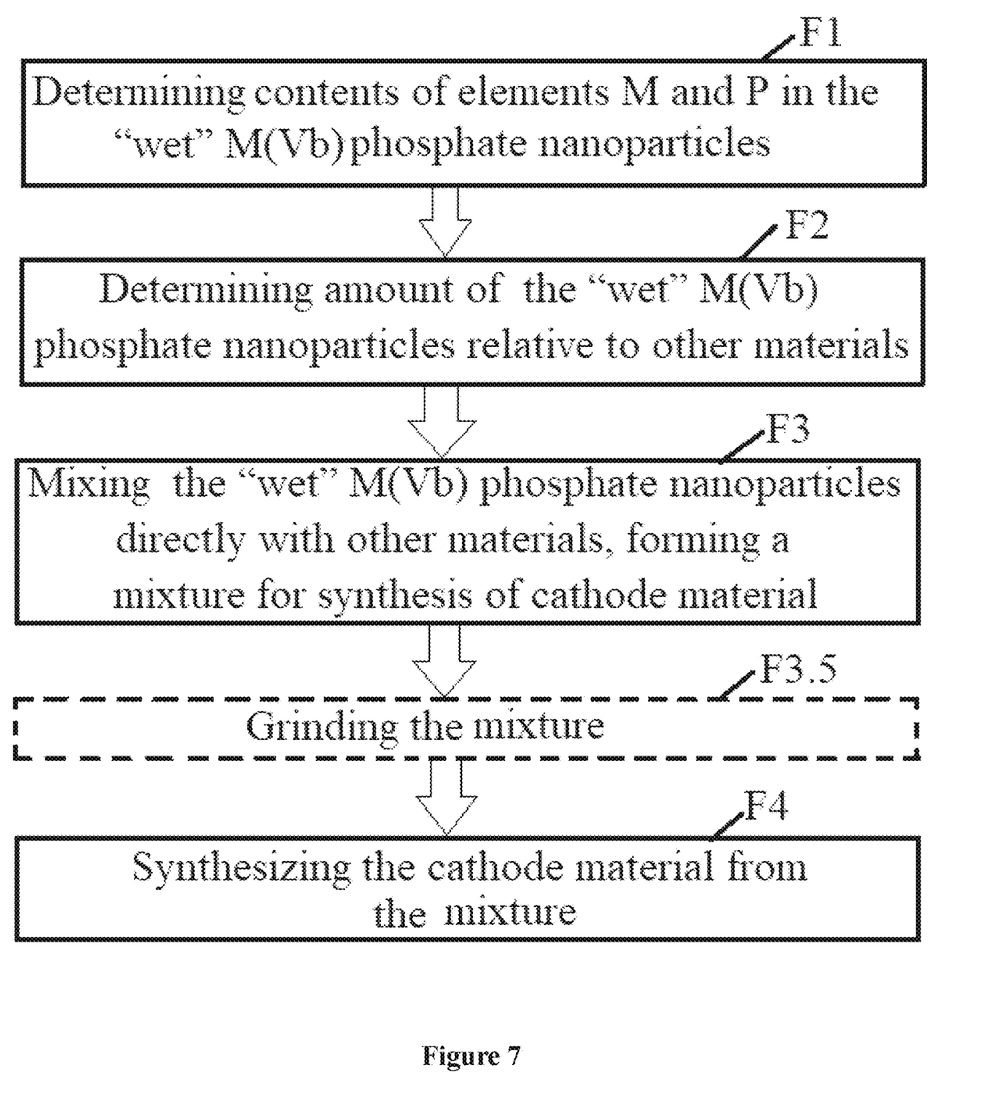
FIG. 7 a method of synthesizing cathode material in accordance with an exemplary embodiment of the present invention.

After the aforementioned step (W5) of water washing, a cathode material may be directly synthesized with the following steps, as shown in FIG. 7:

Step (F1): determining the content/concentration of elements metal M and phosphorus P in the "wet" phosphate salt of metal M(Vb) nanoparticles obtained from step (W5), Step (F2): based on the determined (e.g. measured and/or re-measured) content/concentration of elements M and P and molar ratio between dements M and P calculated therefrom, determining the relative amount of the "wet" phosphate salt of metal M(Vb) nanoparticles as compared to other materials to be used in a synthesis of a cathode material.

Step (F3): mixing the "wet" phosphate salt of metal M(Vb) nanoparticles in the determined relative amount directly with said other materials used in the synthesis of the cathode material, forming a mixture for synthesis of the cathode material, and Step (F4): synthesizing the cathode material from the mixture.

In exemplary embodiments, the mixture for synthesis of the cathode material may include a Li source material such as $Li_2CO_3$, LiOH, or any mixture thereof, the "wet" phosphate salt of metal M(Vb) nanoparticles such as $Fe_xMn_{(1-x)}PO_4$, wherein $0 \leq x \leq 1$; a carbon source material such as glucose, and an optional organic solvent such as methanol, ethanol, and propylene glycol.

As an advantage of the wet sub-process over known methods, a Step (F3.5) of grinding (e.g. ball grinding and sand grinding) the mixture is dramatically reduced or even omitted in synthesizing the cathode material, as compared to a known method using the fully or partially dehydrated phosphate salt crystal of metal M(Vb) as described in the "dry" sub-process, instead of the "wet" phosphate salt of metal M(Vb) nanoparticles in this "wet" sub-process In preferred embodiments, the cathode material as a final product of the "wet" sub-process comprises $LiFePO_4$, $LiMnPO_4$, or $LiFe_{(0\sim1)}Mn_{(1\sim0)}PO_4$.

The purity of the M(Vb) phosphate salt prepared by the method of the present invention is achieved by the combination or accumulation of a few steps, for example, the selective precipitation of phosphate salt of metal M(Vb) and/or hydroxide of metal M(Vb) in step (ii); isolating the precipitate of metal M(Vb) in step (iii) and washing steps thereafter, complete conversion of M(Vb) hydroxide to M(Vb) phosphate salt in step (iv); and the washing steps (D5) or (W5)

In the foregoing specification, embodiments of the present invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicant to be the scope of the invention, is the literal and equivalent scope of the set of claims that issue from this application, in the specific form in which such claims issue, including any subsequent correction.

The invention claimed is:

1. A method of synthesizing a high-purity phosphate salt of a metal M, comprising:
   (i) providing an aqueous solution of metal M(Va) having a first valence value Va;
   (ii) adding a precipitating-oxidizing composition to the aqueous solution to produce a liquid phase and a precipitate of metal M(Vb) having a second valence value Vb, wherein the second valence value Vb is greater than the first valence value Va, and wherein the precipitate of metal M(Vb) comprises hydroxide of metal M(Vb), or mixture of hydroxide of metal M(Vb) and phosphate salt of metal M(Vb);
   (iii) isolating said precipitate of metal M(Vb) from the liquid phase;
   (iv) adding phosphoric acid and water to the isolated precipitate of metal M(Vb), and heating a reaction mixture to an elevated temperature to convert hydroxide of metal M(Vb) in the isolated precipitate to phosphate salt of metal M(Vb).

2. The method according to claim 1, wherein the metal M is Fe, Co, Ni, Mn, Ti, V, or any combination thereof.

3. The method according to claim 1, wherein M(Va) is Fe(II), wherein the aqueous solution of Fe(II) in step (i) is obtained by processing a waste material discharged from the manufacture of titanium dioxide, and wherein the waste material contains $FeSO_4 \cdot 7H_2O$ and/or $FeCl_2$.

4. The method according to claim 3, wherein, the processing of the waste material comprises:
   (a) dissolving the waste material in water to prepare a crude solution;
   (b) increasing pH of the crude solution from about 2.5 to 3.5~5.5 with a basic agent, and heating the crude solution at 50-70° C. to precipitate a solid phase comprising metatitanic acid; and
   (c) removing the solid phase, and collecting water phase of the crude solution, thereby providing an aqueous solution of $FeSO_4$ and/or $FeCl_2$, which is the aqueous solution of metal M(Va) in step (i).

5. The method according to claim 1, wherein the precipitating-oxidizing composition in step (ii) comprises
   (1) an oxidizing agent for oxidizing metal M(Va) to metal M(Vb),
   (2) a basic agent for adjusting pH into a range that metal M(Vb) can be precipitated, and
   (3) an optional agent selected from phosphoric acid, hydrogen phosphate, dihydrogen phosphate, or any mixture thereof.

6. The method according to claim 5, wherein the oxidizing agent is selected from hydrogen peroxide, sodium persulfate, sodium perchlorate, or any combination thereof.

7. The method according to claim 5, wherein the basic agent adjusts the pH into a range of 1.5~7.5 to enable the precipitation reaction of M(Vb) in step (ii).

8. The method according to claim 1, wherein hydroxide of metal M(Vb) and phosphate salt of metal M(Vb) in the precipitate of step (ii) have a molar ratio from 1:99 to 100:0.

9. The method according to claim 1, wherein the liquid phase in step (ii) contains 80-90% by weight of total impurities in the reaction system selected from $SO_4^{2-}$, $Cl^-$, $Li^+$, $Na^-$, $K^+$, $Rb^+$, $Cs^+$, $NH_4^-$ or any mixture thereof, and wherein the isolated precipitate of metal M(Vb) contains 10-20% by weight of said total impurities.

10. The method according to claim 1, further comprising a step of washing the isolated precipitate of metal M(Vb) with DI water for one or more times after step (iii) but before step (iv), to further decrease the amount of total impurities selected from $SO_4^{2-}$, $Cl^-$, $Li^+$, $Na^+$, $Rb^+$, $Cs^+$, $NH_4^+$, or any mixture thereof.

11. The method according to claim 1, wherein M(Vb) is Fe(III), Mn(III) or any combination thereof,
   wherein the amount of phosphoric acid added to the isolated precipitate of metal M(Vb) in step (iv) satisfies a defined ratio of P:M,
   wherein the ratio of P:M is from 1:1 to 1.15:1,
   wherein M stands for the moles of M atoms of the isolated precipitate of metal M(Vb) in step (iii), and
   wherein P stands for a sum of the moles of P atoms in the phosphoric acid added to the isolated precipitate metal M(Vb) in step (iv) and the moles of P atoms in the isolated precipitate of metal M(Vb) in step (iii).

12. The method according to claim 1, further comprising, after step (iv), steps of
   heating the reaction mixture of step (iv) including the phosphate salt of metal M(Vb) to a temperature of about 100° C.,
   keeping the temperature for 1-5 hours for crystallization of the salt,
   aging the salt for 2-24 hours,
   removing free water from the salt, washing the salt with DI water and then removing free water from the salt, for one or more times, until the amount of total impurities selected from $SO_4^{2-}$, $Cl^-$, $Li^+$, $Na^+$, $K^+$, $Rb^+$, $Cs^+$, $NH_4^+$, or any mixture thereof is reduced to a desired level, drying the salt at a temperature of 100-200° C. to further remove residual free water from the salt, and heating the salt to a temperature of 500-600° C. for removing hydrated water in the molecules of the salt, to obtain a fully or partially dehydrated phosphate salt crystal of metal M(Vb).

13. The method according to claim 12, wherein the final product of phosphate salt crystal of metal M(Vb) is $Fe_x Mn_{(1-x)}PO_4$, wherein $0<x<1$.

14. The method according to claim 1, further comprising, after step (iv), steps of heating the reaction mixture of step (iv) including the phosphate salt of metal M(Vb) to a temperature of about 100° C., keeping the temperature for 1-5 hours for crystallization of the salt, aging the salt for 2-24 hours, removing free water from the salt, washing the salt with DI water and then removing free water from the salt, for one or more times, until the amount of total impurities selected from $SO_4^{2-}$, $Cl^-$, $Li^+$, $Na^+$, $K^+$, $Rb^+$, $Cs^+$, $NH_4^+$, or any mixture thereof is reduced to a desired level, so as to obtain a wet phosphate salt of metal M(Vb) nanoparticles.

15. The method according to claim 14, further comprising determining the content/concentration of elements metal M and phosphorus P in the wet phosphate salt of metal M(Vb) nanoparticles;

based on the determined content/concentration of elements M and P and molar ratio between elements M and P calculated therefrom, determining the relative amount of the wet phosphate salt of metal M(Vb) nanoparticles as compared to other materials to be used in synthesis of a cathode material, mixing the wet phosphate salt of metal M(Vb) nanoparticles in the determined relative amount directly with said other materials used in synthesis of the cathode material, forming a reaction mixture for synthesis of the cathode material, and synthesizing, the cathode material.

16. The method according to claim 15, wherein the reaction mixture for synthesis of the cathode material comprises:

a Li source material;

the wet phosphate salt of metal M(Vb) nanoparticles;

a carbon source material, and an optional organic solvent.

17. The method according to claim 1, wherein step (iv) is adding phosphoric acid, water, and M(Vb) phosphate synthesized using a method different from the method according to claim 1, to the isolated precipitate of metal M(Vb), and heating the reaction mixture to an elevated temperature to convert hydroxide of metal M(Vb) in the isolated precipitate to phosphate salt of metal M(Vb).

18. The method according to claim 1, wherein step (iv) is adding phosphoric acid, water, and reactants for a reaction that yields M(Vb) phosphate, to the isolated precipitate of metal M(Vb), and heating the reaction mixture to an elevated temperature to convert M(Vb) hydroxide in the isolated precipitate to M(Vb) phosphate, and to oxidize said M(Va) compounds with said oxidizing agent to yield M(Vb) phosphate, and wherein said reactants comprise (i) M(Va) compounds and (ii) an oxidizing agent.

19. The method according to claim 18, wherein M(Vb) is Fe(III), Mn(III) or any combination thereof, wherein the amount of phosphoric acid added to the isolated precipitate of metal M(Vb) in step (iv) satisfies a defined ratio of P:M, wherein the ratio of P:M is from 1:1 to 1.15:1, wherein M stands for the moles of M atoms of the isolated precipitate of metal M(Vb) in step (iii) combined with the moles of M atoms in said M(Vb) phosphate produced from the reaction of said reactants, and wherein P stands for a sum of the moles of P atoms in the phosphoric acid added to the isolated precipitate metal M(Vb) in step (iv), the moles of P atoms (if any) in the isolated precipitate of metal M(Vb) in step (iii), and the moles of P atoms in said M(Vb) phosphate produced from the reaction of said reactants.

\* \* \* \* \*